United States Patent [19]
Whitney et al.

[11] 3,714,451
[45] Jan. 30, 1973

[54] PHASE SELECTIVE TELEMETRY SYSTEM

[75] Inventors: John A. Whitney, Fort Wayne; Richard E. Woods, Markle; William H. Hohman, Bluffton, all of Ind.

[73] Assignee: Franklin Electric Co., Inc., Bluffton, Ind.

[22] Filed: July 12, 1971

[21] Appl. No.: 161,530

[52] U.S. Cl. .................................. 307/3, 340/310
[51] Int. Cl. .................................... H04g 9/14
[58] Field of Search .......... 307/3, 136, 133; 340/310; 317/11 A

[56] References Cited

UNITED STATES PATENTS

| | | | |
|---|---|---|---|
| 3,486,038 | 12/1969 | Skamfer et al. | 307/133 |
| 3,011,102 | 11/1961 | Balan | 340/310 X |
| 3,462,756 | 8/1969 | Mills | 340/216 X |
| 3,594,584 | 7/1971 | Woods | 307/3 |

FOREIGN PATENTS OR APPLICATIONS 1,092,638   11/1967   Great Britain ..................... 340/310

*Primary Examiner*—Robert K. Schaefer
*Assistant Examiner*—William J. Smith
*Attorney*—George N. Hibben et al.

[57] ABSTRACT

This disclosure deals with a telemetry system adapted to be connected across a pair of transmission lines, the system generating pulses at one location along the line and detecting such pulses at another location. The system is designed for use with a transmission line carrying alternating current and includes one or more pulse transmitters or generators, each of which generates a pulse at a precise phase angle in each cycle of alternating current. The system also includes a pulse receiver or detector associated with each transmitter, each receiver responding only to pulses at the phase angle of the associated transmitter. The phase angle at which a transmitter generates and the associated receiver responds to a pulse is determined by a timing circuit which actuates a device in each AC cycle. In the transmitter, the device is part of a pulse generating circuit and in the receiver the device is part of a pulse responsive circuit.

14 Claims, 10 Drawing Figures

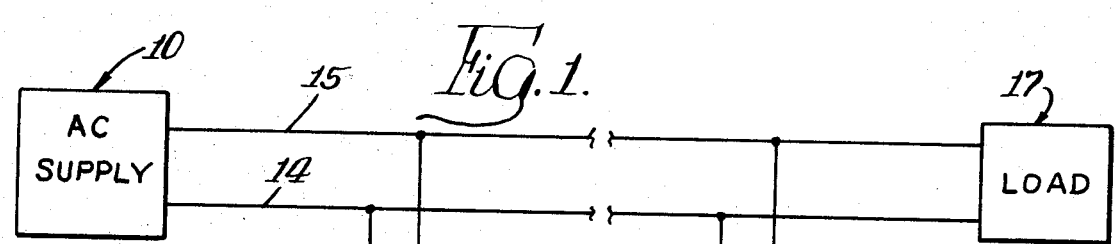
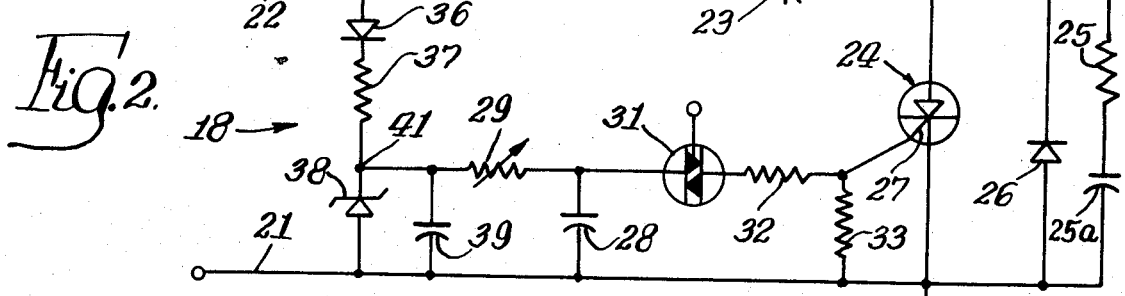
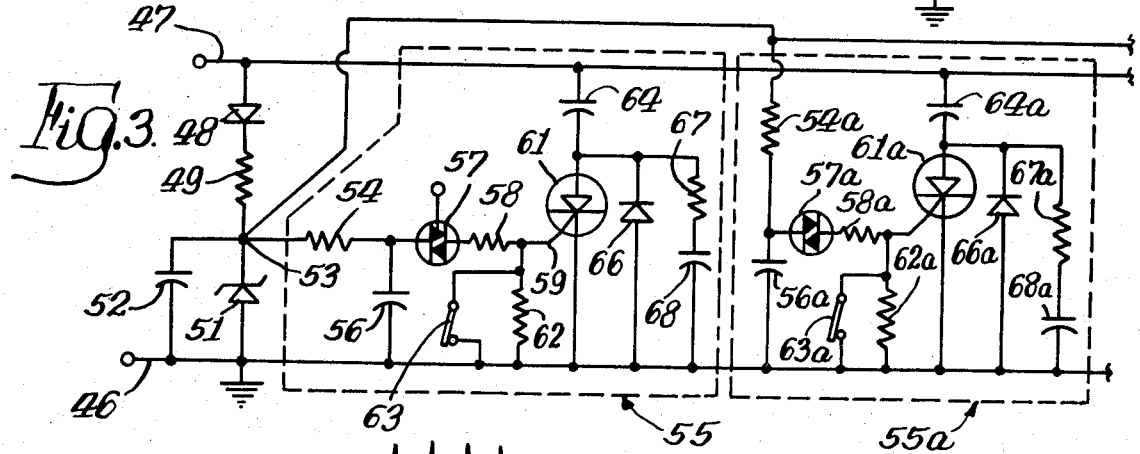
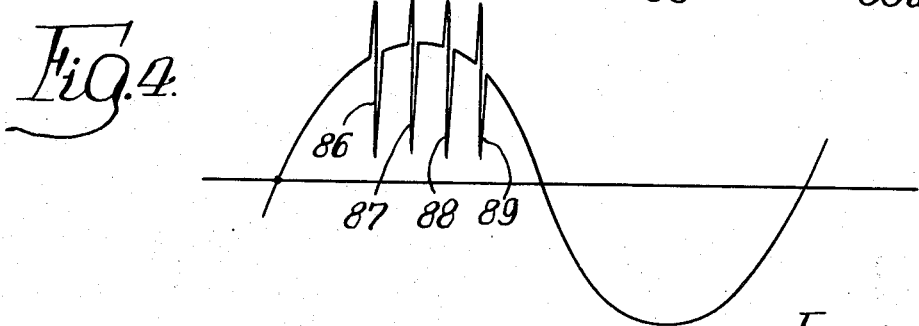

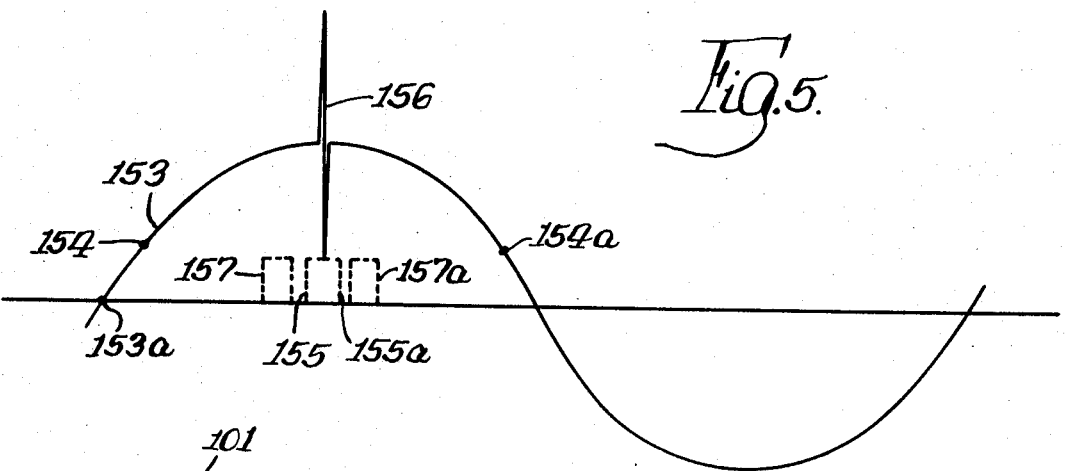
Fig.5.
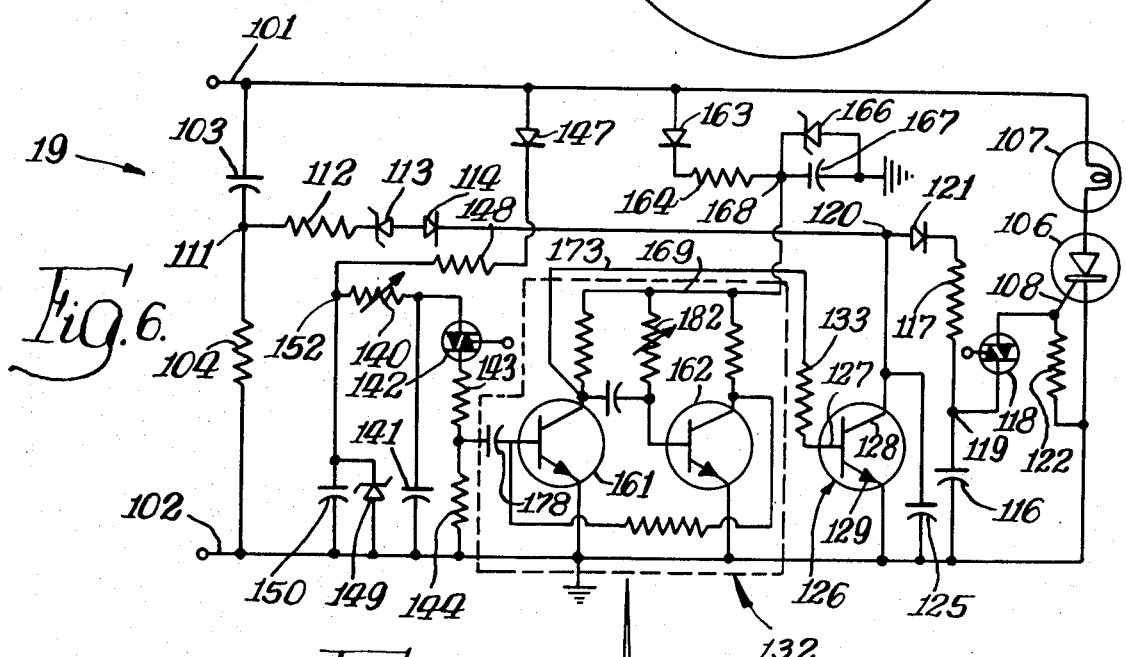
Fig.6.
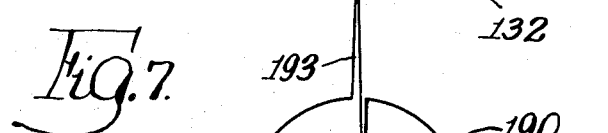
Fig.7.
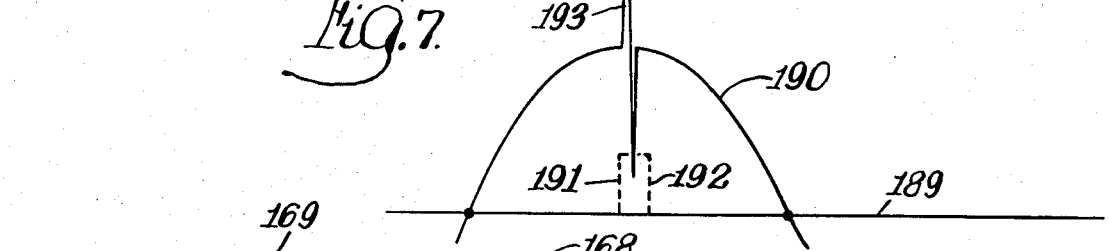
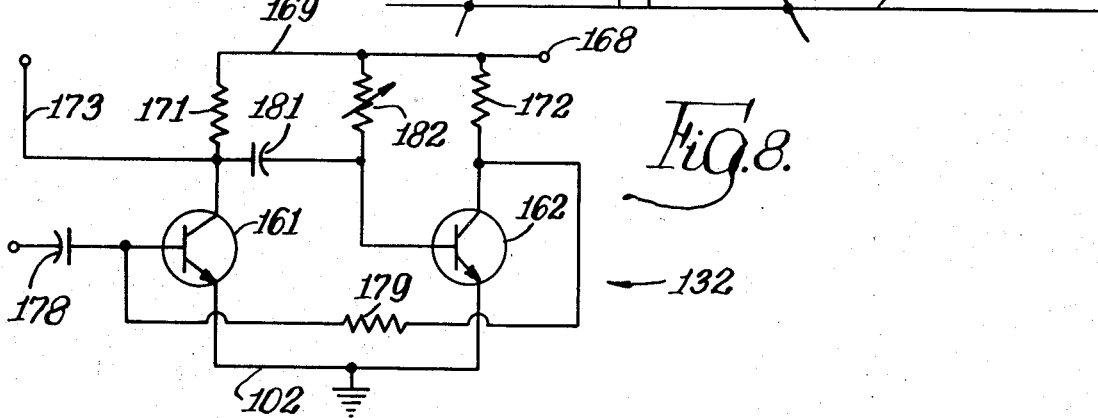
Fig.8.

PHASE SELECTIVE TELEMETRY SYSTEM

Copending patent application of Richard E. Woods Ser. No. 756,931, titled "Telemetry Circuit for an A.C. Power System," discloses pulse generator and detector circuits designed for use in AC system. The generator responds to the changing amplitude of the AC potential across the conductors of the system, and generates at least one pulse in one or both halves of each AC cycle. The generator may be turned on or off in order to convey information. For example, the generator may be turned on by a thermal switch when the temperature of the area where the switch is installed reaches a certain value, and the receipt of pulses by the detector or the absence thereof thus provides an indication of the temperature in that area.

While the generator described in the above-mentioned patent application works well, it is limited as to the amount of information it is able to convey. In the temperature indicating system mentioned above, for example, it is only possible to indicate whether the temperature is above or below a certain value. It is, of course, often desirable to be able to convey a greater amount of information over such a transmission line.

In accordance with the present invention, a telemetry system is provided, which is adapted to be connected to two conductors of an AC transmission line, the AC line voltage across the conductors rising above and falling below a reference value to produce both positive and negative portions of each AC cycle. The system includes phase angle timing circuits comprising supply means responsive to a change from one of said portions to the other by said line voltage to produce a substantially constant level voltage in one of said portions, and a resistor-capacitor combination connected to said supply means for charging said capacitor at a rate determined by the time constant of said combination. Breakdown means is connected between said combination and utilizing means, as hereinafter described, which responds to current flow. The breakdown means has a breakdown voltage which is reached by the charge on said capacitor at a predetermined phase angle in said one portion of each AC cycle, whereby charging of the capacitor to said breakdown voltage results in breakdown of the breakdown means and current flow to the utilizing means.

The telemetry circuit includes at least one transmitter and at least one receiver, each transmitter and each receiver incorporating a phase angle timing circuit. In the transmitter, the utilizing means comprises a switch device which is actuated by current flow through the breakdown means, switch actuation resulting in generation of a pulse on the transmission line at said phase angle. In the receiver, the utilizing means comprises a gate control or setting circuit which determines the range of phase angles to which the receiver is responsive.

Other objects, features and advantages of the present invention will be apparent from the following detailed description taken in conjunction with the accompanying figures of the drawings, wherein:

FIG. 1 illustrates diagrammatically a system including a transmitter and a receiver embodying the invention;

FIG. 2 is a schematic electrical diagram of a pulse transmitter in accordance with the invention;

FIG. 3 is a schematic electrical diagram of a circuit including a plurality of transmitters embodying the invention;

FIGS. 4 and 5 are waveforms illustrating the operation of the invention;

FIG. 6 is a schematic electrical diagram of a pulse receiver embodying the invention;

FIG. 7 is a waveform illustrating the operation of the receiver shown in FIG. 6;

FIG. 8 is a schematic electrical diagram of a portion of the receiver shown in FIG. 6;

Figure 9:
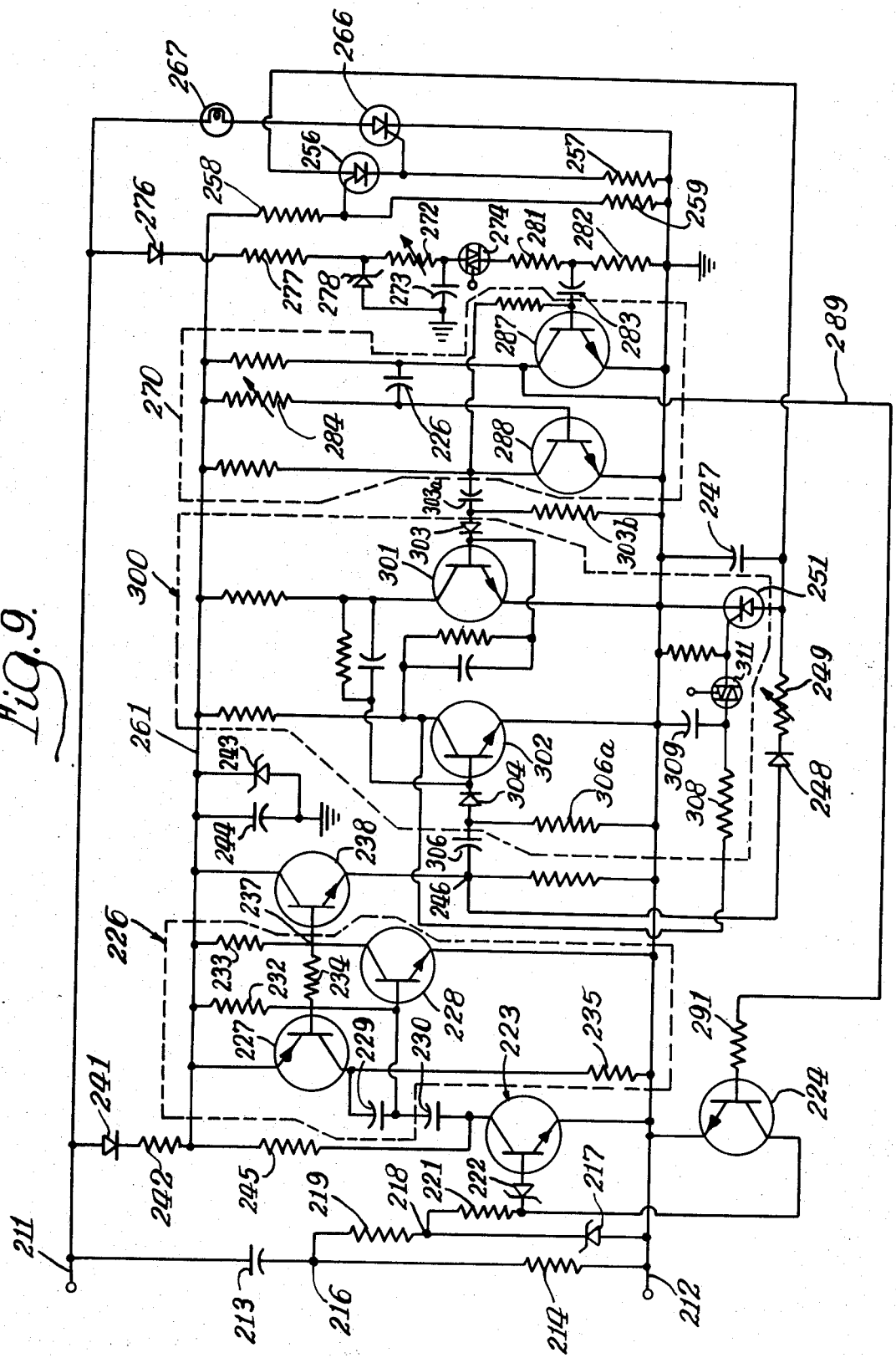
FIG. 9 is a schematic electrical diagram of an alternate form of receiver embodying the invention.

With reference to the drawings, the system shown in FIG. 1 includes an alternating current supply 10 which has its output connected to supply alternating current to two conductors 14 and 15 of a transmission line. In an ordinary three-wire transmission system, any pair of the wires may be used. The supply may for example be an AC power transformer and the load 17 may be an electric motor. A pulse transmitter 18 is connected to generate pulses on the conductors 14 and 15, the pulses being received by a pulse receiver 19 which is also connected to the conductors 14 and 15.

With reference to FIG. 2, the pulse transmitter 18 is shown and comprises a pair of conductors 21 and 22 which are adapted to be connected to the conductors 14 and 15 (FIG. 1). The conductor 21 may be considered the neutral or ground reference conductor, and the potential on the line 22 varies relative to the reference level. For example, the potential may vary sinusoidally and cross the reference level to provide both negative and positive potential portions.

Connected between the two conductors 21 and 22 are a potential storage device or capacitor 23 and a switching device 24 which in the present instance is a silicon controlled rectifier (SCR). A diode 26 is connected in parallel with the SCR 24. The polarity of the SCR 24 is such that it may conduct current when the conductor 22 is positive relative to the conductor 21, and the diode 26 polarity is such that it conducts only when the conductor 22 is negative relative to the conductor 21. If desired, a resistor 25 and a capacitor 25a may also be connected across the SCR 24 to prevent the SCR from turning on in the event the rate of change of the voltage across the SCR exceeds its rated value.

The SCR 24 includes a gate 27 which triggers the SCR 24 into conduction when the voltage thereon is at or above a predetermined value and the conductor 22 potential is positive. The potential on the gate 27 is controlled by a phase angle timing circuit including a capacitor 28, a resistor 29 and a silicon bilateral switch (SBS) 31 (such as a 2N4491). A resistor 32 connects one side of the SBS 31 to the gate 27, and another resistor 33 connects the gate 27 to the reference conductor 21. The capacitor 28 connects the other side of the SBS 31 to the ground reference 21, and this other side of the SBS 31 is also connected to the resistor 29.

A voltage source for the timing circuit is provided, comprising a diode 36, a resistor 37, a zener diode 38, and a capacitor 39. The components 36, 37 and 38 are connected in series across the two conductors 21 and 22, and the capacitor 39 is connected in parallel with the zener diode 38. The resistor 29 is connected to the junction 41 between the resistor 37 and the zener diode 38. The polarity of the diode 36 is such that it will conduct current only from the conductor 22 to the conductor 21, and the zener diode 38 is reverse polarized. In each positive half cycle, the zener diode 38 blocks current flow until the zener voltage is reached, and then the voltage at the junction 41 is held at the zener voltage. The zener voltage of the diode 38 may, for example, be in the area of 14 volts.

Considering the operation of the transmitter shown in FIG. 2, assume that the potential on the conductor 22 varies sinusoidally and has just crossed the reference line or value on the descending side of the waveform. When the potential on the conductor 22 becomes negative, the diode 26 conducts and current flows from the conductor 21, through the diode 26 and the capacitor 23 to the conductor 22. The capacitor 23 will thus be charged to the peak voltage of the AC supply voltage which, for example, will be approximately 170 volts with a supply voltage of 120 volts RMS. During this negative half cycle, the reverse bias on the diode 36 and the SCR 24 prevents current flow through them.

When the potential on the conductor 22 crosses the reference level on the ascending side of the waveform, the diode 26 is biased off and the diode 36 is biased on. The SCR 24 is initially non-conducting because of the absence of a trigger voltage on its gate 27. The potential at the junction 41 rises with the supply voltage until it reaches the zener voltage of the diode 38, after which the diode 38 conducts. The potential at the junction 41 then remains at a fixed value for substantially the remainder of the positive half cycle. The capacitor 39 bypasses any transients appearing across the conductors 21 and 22.

The voltage appearing at the junction 41 results in current flowing through the resistor 29 and charging the capacitor 28 at a rate which is a function of the time constant of the resistor 29 and the capacitor 28. Since the voltage at the junction 41 is held at a fixed value by the zener diode 38 regardless of variations in line potential, the charging rate of the capacitor 28 can be precalculated to reach the breakdown voltage of the SBS 31 at a predetermined phase angle after the crossing of the reference value. At this phase angle, the SBS 31 breaks down and the capacitor 28 discharges through the SBS 31, the resistor 32 and through the gate-cathode circuit of the SCR 24, thereby triggering the SCR 24 into conduction. The capacitor 23 then discharges from the negative peak voltage to which it was previously charged, and recharges to the voltage appearing across the two conductors 21 and 22 at the time the SCR 24 is triggered on. The discharge and recharge of the capacitor 23 lasts for a very short period of time, and generates a pulse which appears across the two conductors 14 and 15. As soon as the capacitor 23 is recharged, the amount of current flowing falls below the latching or holding current of the SCR 24, and consequently the SCR 24 is turned off.

The latching or holding current of the SBS 31 is extremely low, in the area of 100 microamps. Consequently, once the SBS 31 has been triggered to conduction, current flow continues from the capacitor 28 and from the junction 41, through the SBS 31, the resistor 32 and the resistor 33 even after the SCR 24 has stopped conducting, and the SBS 31 will continue to conduct almost until the end of the positive half cycle. While this current is sufficient to maintain the SBS 31 conducting, it is not enough to retrigger the SCR 24 into conduction. This is an important feature of the invention because continued conduction of the SBS 31 prevents a second build-up of charge on the capacitor 28 in the positive half cycle of line voltage, thereby ensuring that only one pulse will be generated in each positive half cycle.

As previously mentioned, the phase angle at which the SBS 31 is triggered on depends upon the time constant of the resistor 29 and the capacitor 28, the zener voltage of the diode 38, and the breakdown voltage of the SBS 31. These factors are readily calculated beforehand and therefore the phase angle at which a pulse is generated may be predetermined. Further, the variable resistor 29 permits adjustment of the phase angle. The values of the resistor 29 and the capacitor 28 are precalculated to produce a time constant which is related to the frequency of the AC line voltage on the conductors 21 and 22, the charging potential at the junction 41, and the breakdown voltage of the SBS 31, to produce a pulse during each positive portion or half cycle of the AC line voltage. The transmitter 18 could, of course, be modified to produce a pulse during the negative half cycles by reversing the polarities of the diodes 36, 38 and 26, and of the SCR 24.

FIG. 3 illustrates a system including a plurality of pulse transmitters, each of which is similar to the transmitter shown in FIG. 2, and each pulse transmitter of the system shown in FIG. 3 is designed to generate a pulse at a distinctive or different phase angle. For example, the system of FIG. 3 could include four transmitters adjusted to produce four pulses as shown in FIG. 4, each pulse having a phase angle different from the pulses at the other phase angles.

In FIG. 3, a pair of conductors 46 and 47 are adapted to be connected across the line conductors 14 and 15, the conductor 46 being considered the ground reference. A constant voltage source is provided by the series connection of a diode 48, a resistor 49 and a zener diode 51, a capacitor 52 again being connected across the zener diode 51. The foregoing components correspond to and operate the same as the corresponding components 36 through 39 in FIG. 2. The junction 53 between the resistor 49 and the zener diode 51 is connected by a resistor 54 to a timing capacitor 56 of a transmitter 55, which components correspond respectively to the resistor 29 and the capacitor 28 shown in FIG. 2. A SBS 57 and a resistor 58 connect the timing capacitor 56 to the gate 59 of a SCR 61, and a resistor 62 connects the gate 59 to the conductor 46. A switch 63 which may, for example, be a mechanical or electronic switch, is connected across the resistor 62. A capacitor 64 is connected in series with the SCR 61 and a diode 66 is connected in parallel with the SCR 61. A resistor 67 and a capacitor 68 are also connected across the SCR 61. With the exception of the switch 63, the components of the transmitter 55 correspond to and operate the same as the components of the transmitter shown in FIG. 2.

When the switch 63 is open, the SCR 61 is triggered when the voltage across the capacitor 56 reaches the breakdown voltage of the SBS 57 and a pulse 86 (FIG.

4) is generated on the line voltage. However, when the switch 63 is closed, any trigger pulse due to the breakdown of the SBS 57 is short-circuited through the switch 63. It will therefore be apparent that the function of the switch 63 is to turn the transmitter 55 on and off.

Also shown in FIG. 3 is a second transmitter 55a which, with one exception, is identical with the transmitter 55. The reference numerals for the components of the transmitter 55a are the same as those for the transmitter 55 but with the addition of suffix a. The one exception mentioned above is that the time constant of the resistor 54a and the capacitor 56a differs from the time constant of the resistor 54 and the capacitor 56. In the present illustration, the components of the transmitter 55a are selected to produce the pulse 87 which occurs at a later phase angle than the pulse 86. The resistor 54a and the capacitor 56a are also connected across the zener diode 51, and the capacitor 64a and the SCR 61a are also connected between the conductors 46 and 47.

The system shown in FIG. 3 may also include two more transmitters (not shown), each of which is the same as the transmitters 55 and 55a except that they produce pulses 88 and 89 (FIG. 4) at different phase angles which are later than the angles of the pulses 86 and 87. Each of the transmitters is connected to the conductors 46 and 47, and while each transmitter may include a separate constant voltage source, in the present illustration each transmitter is connected to the terminal 53.

The system of FIG. 3 may, for example, be employed to transmit information in BCD form. In such use, the pulses 86 to 89 may respectively represent BCD values 8, 4, 2 and 1. As will be discussed hereinafter, receivers capable of distinguishing between the different phase angles are necessary in such use. By selectively opening and closing the switches 63, 63a, etc., the desired information may be transmitted.

In FIG. 6 is illustrated in greater detail the receiver 19 which is designed to respond only to pulses appearing at a phase angle which falls within a short gate width or range of phase angles. The receiver 19 comprises a pair of conductors 101 and 102 which are adapted to be connected across the conductors 14 and 15 of the transmission line, the conductor 102 being considered the ground reference. A capacitor 103 and a resistor 104 are serially connected across the conductors 101 and 102 and serve as a high pass filter to remove the low frequency line voltage. Also connected across the two conductors 101 and 102 are an SCR 106 and a load 107 which may be a relay coil or a light. When the SCR 106 is triggered on, current flows from the conductor 101, through the load 107 and to the conductor 102. The SCR 106 includes a gate 108 by which it may be triggered on.

Pulses generated by the pulse transmitter 18 appear at a junction 111 between the capacitor 103 and the resistor 104. The pulses pass through a resistor 112, a zener diode 113 and a diode 114 to a trigger circuit for the SCR 106. The diodes 113 and 114 permit current flow away from the junction 111 to the trigger circuit when the pulse voltage is above the zener voltage.

The trigger circuit for the SCR 106 comprises a capacitor 116, a resistor 117 and an SBS 118. The SBS 118 is connected between the gate 108 and a junction 119 between the capacitor 116 and the resistor 117. A diode 121 and the resistor 117 are connected between the diode 114 and the junction 119, and the capacitor 116 is connected between the junction 119 and the conductor 102. Another resistor 122 is connected between the gate 108 of the SCR 106 and the conductor 102.

During the gate of the receiver 19, a pulse appearing across the conductors 101 and 102 and having an amplitude greater than the zener voltage of the diode 113, passes through the diodes 114 and 121, through the resistor 117 and partially charges the capacitor 116. When a sufficient number of pulses have been received, the capacitor 116 is charged to the point that the SBS 118 breaks down, resulting in firing of the SCR 106. The diode 121 prevents discharge of the capacitor 116 in the time interval between successive pulses.

To make the receiver sensitive only to pulses appearing during a certain gate as previously mentioned, switch means is provided to shunt the capacitor 116 at all times except during the gate. In the present instance, the switch means comprises a transistor 126 including a base 127, a collector 128 and an emitter 129. The collector 128 and emitter 129 circuit of the transistor 126 is connected between the conductor 102 and the junction 120 between the two diodes 114 and 121, and it will be apparent that when the transistor 126 is saturated, any pulses appearing on the junction 120 will be shunted to the conductor 102 around the capacitor 116. The base 127 potential is controlled by a monostable multivibrator circuit 132 which is also shown in FIG. 8. The base 127 of the transistor 126' is connected through a resistor 133 to the multivibrator 132 such that the transistor 126 is biased on when the multivibrator 132 is in its stable state. The transistor 126 is biased off only during the relatively short time period, or gate width, in each AC cycle when the multivibrator 132 is in its unstable state. The operation of the multivibrator 132 will be discussed hereinafter in connection with FIG. 8.

Trigger pulses to trigger the monostable multivibrator from its stable state to its unstable state in each AC cycle are provided by a timing circuit comprising a resistor 140, a capacitor 141, an SBS 142 and two resistors 143 and 144. Voltage at a fixed or constant level is provided to the trigger circuit by a voltage supply including a diode 147, a resistor 148, a zener diode 149 and a capacitor 150. The diode 147, the resistor 148 and the zener diode 149 are connected in series across the two conductors 101 and 102, the polarity of the diode 147 being such that it permits current flow from the conductor 101 to the conductor 102, and the zener diode 149 clipping voltages above the zener voltage. The capacitor 150 serves as a bypass for transient voltages. The junction 152 between the resistor 148 and the zener diode 149 is connected to the resistor 140, the components 140 through 144 being serially connected between the junction 152 and the conductor 102. The capacitor 141, which serves as a timing capacitor, is connected in parallel with the SBS 142 and the two resistors 143 and 144. The constant voltage supply provides a voltage at the zener voltage in each positive half cycle, and this voltage charges the capacitor 141 through the resistor 140. The rate of charge, of course, depends upon the time constant of the resistor 140 and the capacitor 141. When the charge on the capacitor 141 reaches the breakdown voltage of the SBS 142, it breaks down and the capacitor 141 discharges through the resistor 143 and triggers the multivibrator 132 to its unstable state. As previously mentioned, the holding or latching current of the SBS 142 is extremely low, and consequently once its breakdown voltage has been reached, it continues to conduct until substantially the end of the positive half cycle even though the current flow through the SBS drops to a very low level. This ensures that only one multivibrator trigger pulse will be supplied in each positive half cycle of the line voltage.

With reference to FIG. 8, the monostable multivibrator 132 comprises two transistors 161 and 162, each transistor including a base, a collector and an emitter. Operating potential for the transistors 161 and 162 is provided by a power supply including a diode 163 (FIG. 6), a resistor 164, a zener diode 166 and a capacitor 167. The components 163, 164 and 166 are serially connected between the conductors 101 and 102 and the capacitor 167 is connected in parallel with the zener diode 166. The polarities of the two diodes 163 and 166 are similar to the polarities of the diodes 147 and 149, and consequently in each positive half cycle of alternating current line voltage a constant potential appears at a junction 168 between the resistor 164 and the capacitor 167.

The junction 168 is connected by a conductor 169 (FIGS. 6 and 8) and resistors 171 and 172 to the collectors of the two transistors 161 and 162, and the emitters of the two transistors 161 and 162 are connected to the conductor 102. The output from the multivibrator 132 is taken from the collector of the transistor 161 which is connected by a conductor 173 through a resistor 133 to the base of the transistor 126. A trigger pulse resulting when the SBS 142 breaks down passes through a capacitor 178 to the base of the transistor 161 and through a resistor 179 to the collector of the transistor 162. A timing capacitor 181 and a resistor 182, which is preferably variable, are connected between the conductor 169 and the collector of the transistor 161, the base of the transistor 162 being connected to the junction between the capacitor 181 and the resistor 182.

Considering the operation of the multivibrator circuit 132 with reference to FIG. 7, the transistor 161 is normally non-conducting and the transistor 162 is normally conducting. In FIG. 7, the numeral 189 represents the ground reference line and the numeral 190 represents line voltage. With the transistor 161 non-conducting, a positive potential appears on the conductor 173, which biases the transistor 126 on. When a timing pulse is provided by the timing circuit, the multivibrator 132 is triggered to its unstable state and the conductor 173 approaches zero or ground. The transistor 126 is then biased off until the multivibrator reverts to its stable state. In FIG. 7, the lines 191 and 192 represent the phase angles when the transistor 126 is biased on and off, respectively. The time interval between the lines 191 and 192 may, for example, be 4°, and a pulse 193 must fall within the gate or range of phase angles between the lines 191 and 192 for the receiver to respond to the pulse.

In the transmitters and receivers disclosed herein, the time constant of the resistor and the capacitor, and the breakdown voltage of the breakdown device, must be related to the period of the AC line voltage so that the capacitor charge reaches the breakdown voltage at a certain phase angle after a zero crossing.

Considering the operation of the receiver of FIG. 6 as a whole, assume that the line voltage 153 (FIG. 5) appearing across the conductors 101 and 102 is at a zero crossing 153a on the ascending side of the wave. As soon as the zener voltages of the zener diodes 149 and 166 are reached, they conduct and voltages at a fixed value appear at the junctions 152 and 168. In FIG. 5, the voltage of the diode 149 is represented by the numeral 154. The multivibrator 132 is in its stable state where the transistor 161 is non-conducting and the transistor 162 is conducting. The voltage 154 at the junction 152 causes current to flow through the resistor 140 and the capacitor 141, and at the phase angle 155 the charge on the capacitor 141 reaches the breakdown voltage of the SBS 142 and the multivibrator 132 is triggered from its stable state to its unstable state.

When the multivibrator 132 is in its stable state, the potential on the conductor 173 biases the transistor 126 into saturation thus providing a short circuit through the transistor 126 for any pulses appearing at the junction 120. However, when the multivibrator 132 is in its unstable state between the phase angles 155 and 155a the transistor 126 is biased off and any pulses, such as the pulse 156, having a magnitude greater than the zener voltage of the zener diode 113 and falling within the gate between the phase angles 155 and 155a, place a charge on the capacitor 116. If the pulses occur for a predetermined number of AC cycles, the capacitor 116 will be charged to the breakdown voltage of the SBS 118 and it will then conduct. As previously mentioned, the capacitor 116 will be prevented from discharging between pulses by the diode 121. When the SBS 118 breaks down and conducts, the SCR 106 is triggered on and line current flows through the load 107. The SCR 106 will be turned off at the end of the positive half cycle of AC line voltage. The receiver does not respond to pulses in the negative half cycles because the diode 147 prevents the capacitor 141 from charging.

Thus, the capacitor 116 will respond to pulses only when they fall within the gate between the phase angles 155 and 155a, and a certain number of pulses must be received before the SCR 106 will be triggered on. The SBS 142, due to its extremely low latching or holding current, ensures that the multivibrator 132 will not be triggered to its unstable state more than once in each half cycle. Adjustments in the receiver shown in FIG. 6 may be made by the resistor 140 which will change location of the phase angle 155 and by the resistor 182 which determines the width of the gate between the angles 155 and 155a. The number of pulses which must be received before the SCR 106 is turned on is determined in part by the zener voltage of the diode 113, the time constant of resistor 117 and capacitor 116, the pulse amplitude and width, and the breakdown voltage of the SBS 118. While certain components have been indicated in FIG. 6, and in the other circuits described herein, as being adjustable, it will be obvious that the same results could also be obtained by making other parts adjustable.

As mentioned in connection with FIG. 3, a series of transmitters may be provided in one system, each adjusted to generate a pulse at a different phase angle. In such a system, a corresponding number of receivers similar to the receiver shown in FIG. 6, or the receiver shown in FIG. 9, would have to be provided in parallel, each receiver having a gate at a phase angle corresponding to the phase angle of one of the transmitters. In FIG. 5, three gates are represented, one gate being between the phase angles 155 and 155a and the other two gates being indicated by the numerals 157 and 157a. In this example, each gate has a width of approximately 4° and there is a separation of approximately 2° between adjacent gates. All gates in a half cycle must fall between the zener voltages 154 and 154a at opposite ends of the half cycle, and the maximum number of gates between these limits depends upon the gate width and the gate separation. The latter factors are determined by the stability of the pulse phase angle, which is influenced by drift due to component aging and temperature variations.

FIG. 9 illustrates an alternate receiver that is also designed to respond to pulses occurring within a predetermined gate, this receiver further including means for detecting a missed pulse in a series of pulses and requiring a certain number of pulses for firing. The missing pulse detector is valuable because it prevents false triggering of the receiver by random spurious pulses. The FIG. 9 receiver includes two conductors 211 and 212 which are adapted to be connected to the conductors 14 and 15 of the transmission line, the conductor 212 being considered the ground reference. Connected across the conductors 211 and 212 is the series connection of a capacitor 213 and a resistor 214 which form a high pass filter and attenuate the AC line voltage. Any pulses on the conductors 14 and 15 appear at the junction 216 between the capacitor 213 and the resistor 214, and a zener diode 217 and a resistor 219 clip the pulses to the zener voltage. The resistor 219 and the zener diode 217 are serially connected between the junction 216 of the capacitor 213 and the resistor 214, and the conductor 212. The junction 218 between the diode 217 and the resistor 219 is connected by a resistor 221 and another zener diode 222 to the base of a transistor 223, and the zener voltage of the diode 222 is less than that of the zener diode 217. For example, if the zener voltage of the diode 217 is 6.8 volts and the zener voltage of the diode 222 is 5.1 volts, any potential at the diode 222, which is greater than 5.1 volts will bias the transistor 223 if it appears within the gate, as will be discussed hereinafter.

Assuming for the time being that the pulse appears within the gate, the pulse biases the transistor 223 on and thereby triggers a monostable multivibrator 226 in order to convert the incoming pulse to a pulse having a fixed amplitude and time duration. The monostable multivibrator 226 comprises two transistors 227 and 228, a capacitor 229 and four resistors 232, 233, 234 and 235, these components being connected to form a conventional multivibrator. The input to the monostable multivibrator 226 is from the collector of the transistor 223 to the base of the transistor 228 through a capacitor 230. The output terminal 237 of the monostable multivibrator 226 is connected to the collector of the transistor 228 and consists of a square pulse having a fixed amplitude and width, one such pulse being formed for each incoming pulse received by the transistor 223.

The output terminal 237 of the monostable multivibrator 226 is connected to the base of another transistor 238 which amplifies the current output of the multivibrator 226 and produces a positive pulse having a fixed width each time the multivibrator 226 is triggered to its unstable state, such positive pulse appearing at the emitter of the transistor 238.

The power supply for the transistors is provided by a diode 241, a resistor 242, a zener diode 243 and a capacitor 244, the components 241 to 243 being connected in series between the conductors 211 and 212. The capacitor 244 is again connected across the zener diode 243, and the output of the power supply is connected to a conductor 261. The conductor 261 is connected through a resistor 245 to the transistor 223 and it is connected to the two transistors 227 and 238.

The positive pulses on the emitter of the transistor 238 appear at a junction 246 which is connected to charge a capacitor 247. A diode 248 and a resistor 249, which in the present instance is a variable resistor, are connected between the junction 246 and the capacitor 247. The polarity of the diode 248 is such that current may flow only from the junction 246 to the capacitor 247. Thus, positive pulses at the junction 246 charge the capacitor 247, and the diode 248 prevents discharge of the capacitor 247 in the intervals between pulses. As will be discussed hereinafter an SCR 251 is connected in parallel with the capacitor 247 to discharge the capacitor 247 in the event one pulse in a series of pulses is missing, thus requiring a continuous succession of a predetermined number of pulses.

When the charge on the capacitor 247 reaches a certain value, it causes a complimentary SCR 256 to conduct, which has its anode connected to the capacitor 247 and its cathode connected through a resistor 257 to the conductor 212. The gate of the SCR 256 is held at a fixed value by a voltage divider consisting of resistors 258 and 259 which are connected in series between the conductor 212 and the conductor 261. The voltage on the anode of the SCR 256 is normally below the value at which it conducts, but an increase in the anode voltage due to build-up of charge on the capacitor 247 triggers the SCR 256 into conduction. When the SCR 256 conducts the capacitor 247 discharges into the gate of another SCR 266 which is connected in series with a load 267 and across the two conductors 211 and 212, and triggers the SCR 266 on.

Thus, when the charge on the capacitor 247 reaches a certain value, the SCR 266 is triggered to conduction and current flows through the load 267. As previously mentioned, the foregoing can occur only if the pulses appear within a certain gate, and another monostable multivibrator circuit 270 is provided to fix the location and width of this gate. Further, a timing circuit is provided to trigger the multivibrator 270 in order to generate the gate. The timing circuit includes a resistor 272, which in the present instance is a variable resistor, a capacitor 273 and an SBS 274, the capacitor 273 being connected to be charged by a constant voltage source comprising a diode 276, a resistor 277 and a zener diode 278. The components 276 to 278 are connected in series across the conductors 211 and 212, and the zener diode 278 being connected across the resistor 272 and the capacitor 273. In each positive half cycle of the AC line voltage, the potential across the zener diode 278 causes the capacitor 273 to charge, and at a predetermined phase angle which is determined by the time constant of the resistor 272 and the capacitor 273 and by the breakdown voltage of the SBS 274, the SBS 274 conducts and discharges the capacitor 273 through resistors 281 and 282. The input to the monostable multivibrator 270 is taken from the junction of the two resistors 281 and 282, a capacitor 283 also being connected between this junction and the input of the monostable multivibrator 270.

The monostable multivibrator 270 is constructed and operates in a conventional fashion and is triggered to its unstable state in each positive half cycle of the alternating current line voltage as previously explained, and the length of time it remains in its unstable state is determined by the value of a resistor 284 and a capacitor 226. The time the multivibrator is in its unstable state is of course also the width of the gate.

The multivibrator 270 includes two transistors 287 and 288, the input being on the base of the transistor 287 and an output being taken from the collector of the transistor 287. A square-shaped pulse appears on the collector of the transistor 287 only when the multivibrator 270 is in its unstable state, and this pulse is connected by a conductor 289 through a resistor 291 to the base of a switching transistor 224.

As previously mentioned, a predetermined number of pulses in a continuous sequence must also be provided in order to trigger the SCR 266 into conduction, and a missing pulse circuit 300 is provided to detect the absence of a pulse in a sequence. The missing pulse detector circuit 300 comprises a conventional bistable multivibrator or flip-flop including two transistors 301 and 302. The base of the transistor 301 is connected through a diode 303 and a capacitor 303a to the collector of the transistor 288. Further, the base of the transistor 302 is connected through a diode 304 and a capacitor 306 to the junction 246 to receive the positive pulse output from the transistor 238 which appears each time a pulse is received by the conductors 211 and 212 within the gate.

The capacitor 303a and a resistor 303b differentiate the square pulse output of the multivibrator 270 and produce a sharp pulse at the leading edge of the square pulse, the sharp pulse setting the flip-flop. Similarly, the capacitor 306 and a resistor 306a differentiate the square pulse output of the transistor 238 to produce a sharp pulse at the leading edge of the square pulse, which resets the flip-flop. When the flip-flop is set, transistor 302 is nonconducting and a capacitor 309 charges through a circuit including the conductor 261, the transistor 302 collector-resistor, the resistor 308, the capacitor 309 and the conductor 212. When the flip-flop is reset, the transistor 302 conducts and the capacitor discharges through the transistor 302 and the resistor 308. If the capacitor 309 charges high enough, an SBS 311 breaks down and triggers the SCR 251 into conduction, thus discharging capacitor 247. The time constant of the capacitor 309 and the resistor 308 is such that first a set pulse and then a reset pulse must occur within a gate to prevent the capacitor 247 from being discharged.

To summarize the operation of the receiver circuit shown in FIG. 9, a pulse appearing across the conductors 211 and 212 and having a sufficient amplitude, relative to the zener diode 217, is either shorted to ground through the transistor 224 if it appears outside of the gate, or it triggers the monostable multivibrator 226 to its unstable state if it appears within the gate. The gate width is fixed by the multivibrator 270 which responds to the timing circuit including the resistor 272, the capacitor 273 and the SBS 274. The multivibrator 226 transforms the pulse into a constant width and amplitude pulse which is connected to charge the capacitor 247. A plurality of pulses are necessary to charge the capacitor 247 to the point where the SCR 256 and the SCR 266 fire. The missing pulse detector circuit 300 detects the absence of any pulse in a series, and if one is missing the circuit 300 discharges the capacitor 247. However, if all pulses in a series are present the charge on the capacitor 247 builds up to the point where the SCRs 256 and 266 are triggered and current flows through the load 267. Current flow through the load 267 continues until the AC line voltage passes through the next zero crossing.

Figure 10:
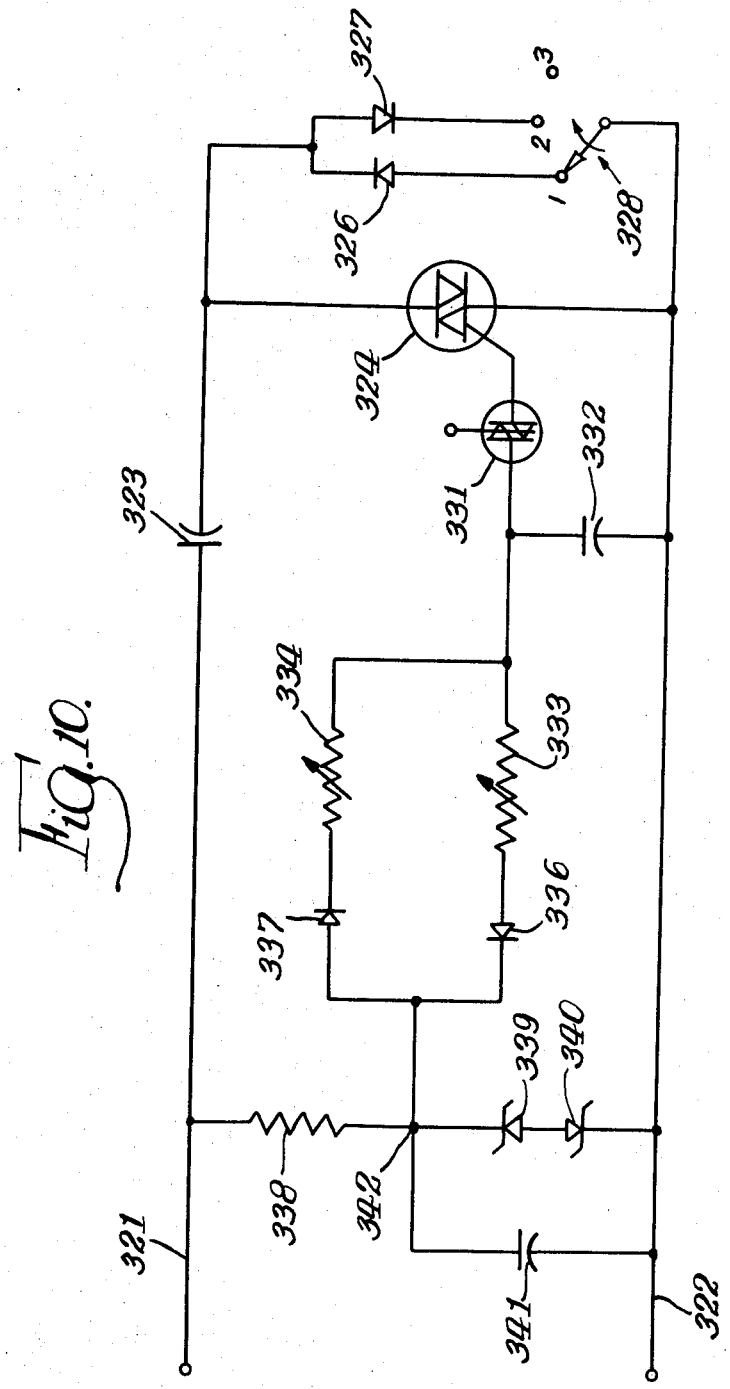
FIG. 10 is another alternate form of transmitter embodying the invention.

FIG. 10 illustrates another form of a transmitter which is similar to the transmitter illustrated in FIG. 2 but which is capable of generating a pulse on the positive portion of each AC cycle, or a pulse on the negative portion of each cycle, or pulses on both the positive and negative portions of each cycle. The transmitter comprises two conductors 321 and 322, the conductor 322 being the ground reference. A capacitor 323 and a TRIAC 324 are connected in series between the conductors 321 and 322. Two diodes 326 and 327 are connected in parallel with the TRIAC 324, and a three-position selector switch 328 is connected to selectively connect one or the other of the two diodes 326 and 327, or neither, in parallel with the TRIAC 324.

The transmitter shown in FIG. 10 further includes a phase angle timing circuit including an SBS 331, a capacitor 332, and resistors 333 and 334. The resistor 333 is connected between the SBS 331 and a diode 336, and the resistor 334 is connected between the SBS 331 and another diode 337. The diode 336 is connected to permit current flow from the conductor 322, through the capacitor 332, the resistor 333 and the diode 336 when the conductor 321 is negative relative to the conductor 322, and the diode 337 is connected to permit current flow in the opposite direction from the conductor 321 to the conductor 322 when the conductor 321 is positive.

The power supply for the phase angle timing circuit comprises a resistor 338, two zener diodes 339 and 340, and a capacitor 341. The components 338 to 340 are connected between the two conductors 321 and 322 and the capacitor 340 is connected in parallel with the two zener diodes. The junction 342 between the resistor 338 and the two zener diodes is connected to the two diodes 336 and 337, and the capacitor 332 is charged in both the positive and negative half cycles of the AC line voltage.

When the selector switch 328 is in its position where it connects the diode 326 into the circuit, the operation of the transmitter is the same as that of the transmitter shown in FIG. 2, and a pulse is provided on the positive portion of each AC cycle. When the switch 328 is set to its position where it connects diode 327 into the circuit, a pulse is provided on the negative portion of each cycle. When the switch 328 is in its third position where neither of the diodes 326 and 327 is in the transmitter circuit, pulses will be provided in both the positive and the negative portions of each cycle.

When using the transmitter shown in FIG. 10 in the third mode mentioned above, two separate receivers may be provided, one constructed to receive pulses on the negative portions of the AC cycles and having a gate which corresponds to the phase angle set by the resistor 333 and the capacitor 332. The other receiver would be constructed to respond to pulses on the positive half cycles and the phase angle of its gate would correspond to the phase angle set by the capacitor 332 and the resistor 334.

The values of the components of the various circuits depend on the frequency and amplitude of the AC line voltage and upon the phase angle desired. The following is a list of values for the components of the receiver shown in FIG. 6 when used in connection with a 60-cycle 110-volt transmission line, these values being given as an example of an operative circuit embodying the invention:

| | |
|---|---|
| diode 113 — 120V Zener 500 Milliwatts | resistor 172 — 5.6k ½ Watt |
| diodes 114,163,121,147 — IN 4001 | resistor 133 — 39k ½ Watt |
| diodes 166,149 — IN 4746 Zeners | resistor 117 — 24k ½ Watt |
| SBS 142 — 2N 4991 | resistor 122 — 1k ½ Watt |
| resistor 104 — 820Ω½Watt | capacitor 103 — 0.02MFD 200V |
| resistor 112 — 4.7k ½ Watt | capacitor 167 — 22MFD 20V DC |
| resistor 164 — 10k 2 Watt | capacitor 150 — 0.05MFD 20V DC |
| resistor 148 — 10k 2 Watt | capacitor 141 — 1MFD 15V DC |
| resistor 140 — 0-30k Potentiometer | capacitor 178 — 0.05MFD 15V DC |
| resistor 143 — 220Ω½ Watt | capacitor 181 — 0.002MFD 50V DC |
| resistor 144 — 12Ω½ Watt | capacitor 125 — 0.01MFD 50V DC |
| resistor 171 — 5.6k ½ Watt | capacitor 116 — 0.02MFD 15V DC |
| resistor 182 — 0-5k Potentiometer | transistors 161,162,126 — 2N 3391 |
| resistor 179 — 39k | SCR 106 — C106 series |

It will be apparent from the foregoing that a novel and useful telemetry system has been provided. The telemetry system may be used to transmit any data desired, and a large amount of information may be transmitted. The telemetry system is particularly valuable because it can be connected to existing AC power lines, for example, thus avoiding the necessity of installing separate transmission lines for the telemetry system. The phase angle timing circuit of the telemetry system is particularly useful because similar circuits are used in both the transmitter and the receiver. In the transmitter the timing circuit sets the phase angle of the pulse while in the receiver the timing circuit sets the phase angle of the gate. The use of a breakdown device in the timing circuit, having an extremely low latching or holding current, ensures that only one pulse and gate will be provided in an AC half cycle.

We claim:

1. Phase angle timing circuit means adapted to be connected to two conductors of an AC transmission line, comprising a capacitor, a charging circuit including a resistor connected to said capacitor, and charging means for charging said capacitor through said resistor at a rate dependent on the time constant of said capacitor and said resistor, said charging means being adapted to be connected to a power supply and including means connected in parallel with said capacitor for initiating charging of said capacitor at a fixed point in the period of a cycle of the AC voltage on the transmission line and for maintaining constant the voltage across said capacitor, and a discharging circuit including a breakdown device connected to said capacitor, said breakdown device having a breakdown voltage and a low latching current and remaining conducting from breakdown to substantially the end of said period, said time constant being related to said period of the AC voltage to charge said capacitor to said breakdown voltage at a fixed phase angle in said period.

2. Circuit means as in claim 1, wherein said charging means is adapted to be connected to said transmission line for power, and said means for initiating charging of said capacitor comprises a zener diode.

3. Circuit means as in claim 1, and further including a switch connected to said breakdown device in said discharging circuit, said switch being actuated by current flow upon breakdown of said breakdown device.

4. Circuit means as in claim 3, and further including pulse generating means connected to said switch and adapted to be connected to said transmission line for generating a pulse on said line upon actuation of said switch.

5. Phase angle timing circuit means adapted to be connected to two conductors of an AC transmission line, comprising a capacitor, a charging circuit including a resistor connected to said capacitor, and charging means for charging said capacitor through said resistor at a rate dependent on the time constant of said capacitor and said resistor, said charging means being adapted to be connected to a power supply and including means for initiating charging of said capacitor at a fixed point in the period of a cycle of the AC voltage on the transmission line, a discharging circuit including a breakdown device connected to said capacitor, said breakdown device having a breakdown voltage, said time constant being related to said period of the AC voltage to charge said capacitor to said breakdown voltage at a fixed phase angle in said period, and further including monostable multivibrator means connected to said breakdown device in said discharging circuit, said multivibrator means being actuated to its unstable state by current flow upon breakdown of said breakdown device.

6. Circuit means as in claim 5, and further including circuit means adapted to respond to a series of pulses, and switch means connected to said circuit means to control the flow of pulses to said circuit means, said switch means further being connected to respond to said multivibrator means to enable the flow of pulses to said circuit means only during said unstable state.

7. Circuit means as in claim 6, wherein said circuit means comprises integrating means for integrating a plurality of pulses, and switch means connected to said integrating means and actuated by a predetermined number of said pulses.

8. Circuit means as in claim 7, and further including missing pulse detecting means connected to respond both to said multivibrator means and to said pulses for providing a missing pulse signal when a pulse is not received during each unstable state of said multivibrator, said detecting means further being connected to said integrating means to deactivate said integrating means in response to a missing pulse signal.

9. A transmitter circuit adapted to be connected to two conductors of an AC transmission line, comprising a capacitor, a charging circuit including a resistor connected to said capacitor, and charging means for charging said capacitor through said resistor at a rate dependent on the time constant of said capacitor and said resistor, said charging means being adapted to be connected to said two conductors and including means for initiating charging of said capacitor at a fixed point in the period of each cycle of the AC voltage on the transmission line, and a discharging circuit including a breakdown device connected to said capacitor and a current responsive switch connected to said device, said breakdown device having a breakdown voltage, said time constant being related to said period of the AC voltage to charge said capacitor to said breakdown voltage at a fixed phase angle in said period, breakdown of said device resulting in current flow to and actuating of said switch, said switch comprising a TRIAC, and further including a capacitor connected in series with said TRIAC.

10. A circuit as in claim 9, wherein said charging circuit further includes a second resistor connected in parallel with said first-mentioned resistor, and a diode connected in series with each of said resistors, said diodes being connected for current flow in opposite directions through said capacitor.

11. A receiver circuit adapted to be connected to two conductors of an AC transmission line, comprising a capacitor, a charging circuit including a resistor connected to said capacitor, and charging means for charging said capacitor through said resistor at a rate dependent on the time constant of said capacitor and said resistor, said charging means being adapted to be connected to said two conductors and including means for initiating charging of said capacitor at a fixed point in the period of a cycle of the AC voltage on the transmission line, and a discharging circuit including a breakdown device connected to said capacitor and a monostable multivibrator connected to said breakdown device, said breakdown device having a breakdown voltage, said time constant being related to said period of the AC voltage to charge said capacitor to said breakdown voltage at a fixed phase angle in said period, breakdown of said device resulting in current flow to and triggering of said multivibrator.

12. A circuit as in claim 11, and further including pulse responsive means and switch means adapted to be connected to said two conductors and connected to said pulse responsive means and to said multivibrator, said multivibrator actuating said switch means to control the flow of pulses to said pulse responsive means.

13. A multi-channel telemetry system adapted to be connected to two conductors of an AC transmission line, comprising at least two transmitters and at least two receivers, each of said transmitters being associated with one of said receivers, each of said transmitters and receivers including phase angle timing circuit means comprising a capacitor, a charging circuit including a resistor connected to said capacitor, and charging means for charging said capacitor through said resistor at a rate dependent on the time constant of said capacitor and said resistor, said charging means adapted to be connected to a power supply and including means for initiating charging of said capacitor at a fixed point in the period of a cycle of the AC voltage on the transmission line, and a discharging circuit including a breakdown device connected to said capacitor, said breakdown device having a breakdown voltage, said time constant being related to said period of the AC voltage to charge said capacitor to said breakdown voltage at a fixed phase angle in said period, and said phase angle for each of said transmitters and the receivers associated therewith being different from the other transmitters and the receivers associated therewith.

14. A telemetry system for use on two conductors of an AC transmission line, comprising at least two transmitters, a receiver associated with each of said transmitters, each of said transmitters and said receivers being adapted to be connected to said two conductors, each of said transmitters including phase angle timing means adapted to respond to the AC voltage on said conductors and generate a pulse on said conductors, said timing means for one transmitter being different from said timing means for the other transmitter in order to generate pulses at different phase angles, and each of said receivers including phase angle timing means adapted to respond to the AC voltage on said conductors and enable the receiver during the phase angle of the associated transmitter.

* * * * *